United States Patent [19]

Pyhälammi et al.

[11] Patent Number: 4,689,805
[45] Date of Patent: Aug. 25, 1987

[54] METHOD OF AND A DEVICE FOR CORRECTING SIGNAL DISTORTION CAUSED BY A CABLE

[75] Inventors: Seppo Pyhälammi, Helsinki; Matti Reini, Espoo, both of Finland

[73] Assignee: OY Nokia AB, Helsinki, Finland

[21] Appl. No.: 857,104

[22] Filed: Apr. 29, 1986

[51] Int. Cl.⁴ .......................... H03H 7/30; H03H 7/40
[52] U.S. Cl. ........................................ 375/11; 375/99; 328/162
[58] Field of Search ...................... 375/11, 14, 99, 100, 375/101, 104; 307/511, 520; 328/162, 165, 173, 175; 455/283, 278, 296

[56] References Cited

U.S. PATENT DOCUMENTS

| | | | |
|---|---|---|---|
| 4,032,847 | 6/1977 | Unkauf | 375/101 |
| 4,112,370 | 9/1978 | Monsen | 375/100 |
| 4,355,402 | 10/1982 | Kromer, III | 375/111 |
| 4,447,910 | 5/1984 | Smith et al. | 375/99 |
| 4,458,355 | 7/1984 | Motley et al. | 375/82 |
| 4,503,104 | 7/1985 | Kamerman | 375/99 |
| 4,503,545 | 3/1985 | Bremer et al. | 375/101 |
| 4,520,492 | 5/1985 | Weber | 375/99 |
| 4,564,934 | 1/1986 | Macchi | 370/32 |

FOREIGN PATENT DOCUMENTS

| | | |
|---|---|---|
| 0039979 | 5/1981 | European Pat. Off. . |
| 0064201 | 4/1982 | European Pat. Off. . |
| 3329470 | 3/1985 | Fed. Rep. of Germany . |
| 0441052 | 9/1985 | Sweden . |

Primary Examiner—Robert L. Griffin
Assistant Examiner—Stephen Chin
Attorney, Agent, or Firm—Cushman, Darby & Cushman

[57] ABSTRACT

The present invention relates to a method for the correction of a signal distortion caused by a cable at the receiving end. To obtain adaptivity the method according to the invention comprises the steps of treating the received signal by an equalizer circuit, multiplying the output signal of the equalizer circuit by a correction coefficient and combining the signal obtained through the multiplication with the received signal to produce a corrected signal. The method further comprises detecting the corrected signal, taking a sample value of the output of the detector at a prescribed moment and holding the sample value up to the following sampling, comparing the sample value with a prescribed reference value, and determining the value of a new correction coefficient on the basis of the comparison in order to obtain a sample value equalling the reference value.

15 Claims, 18 Drawing Figures

DATA

BI-PHASE

FIG. 2b

CORRECT PHASE

FIG. 2c

INCORRECT PHASE

FIG. 2d $\phi_1$ $\phi_2$

RESET

S/$\overline{H}$

METHOD OF AND A DEVICE FOR CORRECTING SIGNAL DISTORTION CAUSED BY A CABLE

FIELD OF THE INVENTION

The invention relates to the correction of signal distortion caused by a cable in a transmission line at the receiving end. In particular, the invention is concerned with a method and a device for correcting distortion resulting from the cable in a baseband modem of 80 to 160 kbit/s.

DESCRIPTION OF THE PRIOR ART

Figure 1A:
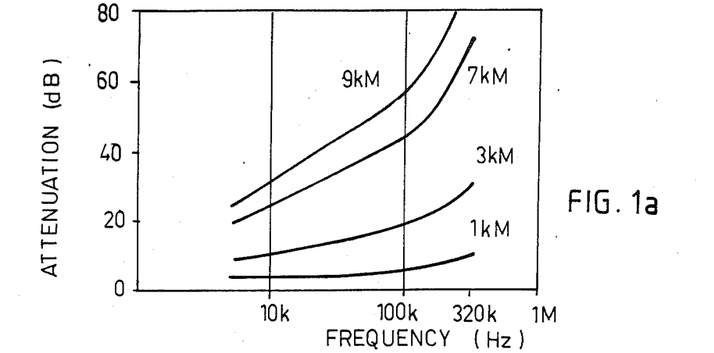
FIG. 1a shows typical cable attenuation curves with different cable lengths.

Cable attenuation (A) is typically such as illustrated by the attenuation curve of FIG. 1a of the attached drawings. It is apparent from FIG. 1a that the cable attenuation increases sharply with frequency. At frequencies exceeding 100 kHz, the increase in the attenuation is already very strong. The signal distortion resulting therefrom causes problems particularly in digital data transmission as it impedes the identification of pulses and, when the distortion is sufficiently great, makes it completely impossible to carry out the reception by conventional methods. Because data transmission, however, aims at high transmission speeds, the distortion caused by the cable must be corrected in one way or another. This problem is particularly apparent when conventional telephone network is used in a high-speed data transmission effected by modems.

Distortion correction can be most simply effected by means of a stationary equalizer which is optimal for one cable connection only. Every time the modem is shifted, however, the equalizer must be replaced to correspond to the new transmission line if the best possible correction is to be provided.

In view of the operation, it is, however, more advantageous to use an adaptive equalizer which automatically adjusts distortion correction so that it suits the transmission line. Among such equalizers, a digital one is efficient but difficult to be effected at high frequencies.

One known adaptive equalizer is based on the attenuation caused by the transmission line. The input level of the receiver is thereby used in an adjusting criterion, on the basis of which the equalizer is controlled in a predetermined way so that it corresponds to the attenuation occuring in the line. The operation of this kind of equalizer, however, is dependent on the sending level of the opposite end. In addition, the equalizer must be positioned at the first stages of the receiver so that the input level will be known. This can be easily carried out in a four-wire modem in which both directions of transmission have their own pair of wires. However, if the same pair of wires is used in both directions of transmission, the level of the incoming (received) signal is difficult to determine because the incoming and the outgoing signal get mixed with each other. The two directions of transmission must thereby be separated from each other, e.g. by an echo suppressing method. Information of the input level of the signal received is thereby usually lost.

So there is a need for an adaptive equalizer which is adjustable on the basis of the actual distortion instead of the input level of the signal. The equalizer should be efficient in operation as well as simple and inexpensive in comparison with a digital equalizer.

BRIEF DESCRIPTION OF THE PRESENT INVENTION

The method according to the invention enables an equalizer to be provided which meets the above requirements. The equalizer can be positioned before or after an echo suppressing point. If it is positioned before the echo suppressing point, the adjustment thereof must be slower than the echo suppressor.

In the method according to the invention the received signal is treated by an equalizer circuit, the transfer function of which approximates the inverse function of the transfer function of the cable with certain parameters. The output signal of the equalizer circuit is multiplied by a correction coefficient, the resulting signal being combined with the received signal. In addition, the combined signal is applied to an integrator to be integrated in the input thereof during a first predetermined period of time and to be integrated in the input thereof in inverted form during a second predetermined period of time, the integrator being reset to zero at the end of the second period of time. Further, a sample value is taken of the output of the integrator at a predetermined moment at the end of the second period of time before the resetting of the integrator, which sample value is held up to subsequent sampling and compared with a predetermined reference value, the value of a new correction coefficient being determined on the basis of the comparison so as to obtain a sample value equalling the reference value.

BRIEF DESCRIPTION OF THE DRAWINGS

The following drawings are referred to in a detailed description of the method and the device according to the present invention, whereby.

DETAILED DESCRIPTION OF THE INVENTION

In order to facilitate understanding of the method according to the invention, a bi-phase coded signal and the detection thereof by the Integration and dump -method are discussed first. However, it is to be understood that even if the preferred embodiment of the invention such as disclsoed below is effected for a bi-phase code, the method is also applicable for other codes, such as, e.g., a three-level AMI.

Figure 2A:
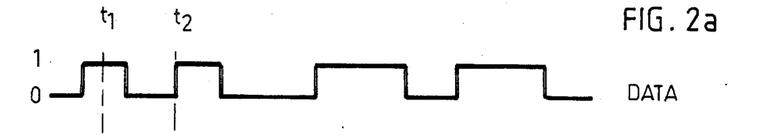
FIGS. 2a–2e illustrate the timing of the signals when a bi-phase coded signal is detected by an Integration and dump -method.
Figure 2B:
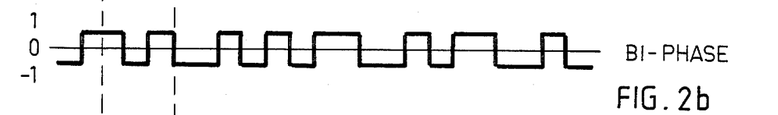

Coding of the original signal into a bi-phase signal appears from FIGS. 2a and 2b. It can be seen that two bi-phase pulses are needed for one zero bit of the original data. Therefore, it is necessary to extend the frequency range to be observed up to 320 kHz when a bi-phase code and a transmission speed of 160 kbit/s are used. It appears from FIG. 1a that it is within this range that the increase in the attenuation is very sharp.

Figure 3A:
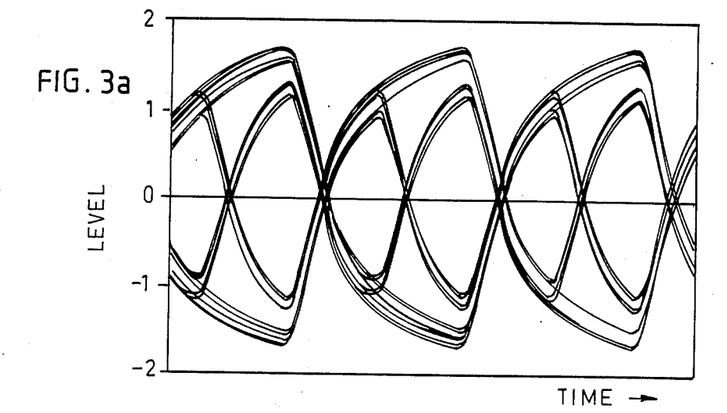
FIGS. 3a and 3b illustrate eye patterns of a bi-phase signal before decoding at a transmission speed of 80 kbit/s and with different cable lengths.
Figure 3B:
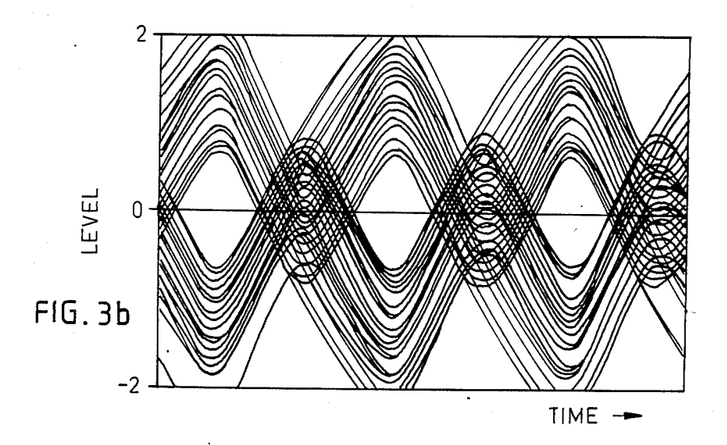

Distortion of a bi-phase signal caused by the cable according to FIG. 1a is illustrated in FIGS. 3a and 3b. The Figures illustrate eye patterns of the bi-phase signal at a transmission speed of 80 kbit/s. In FIG. 3a, the cable length is 3 km, whereby it is still possible at the receiving end to clearly distinguish the larger eye corresponding to the 1-bits and the smaller eye corresponding to the 0-bits. The smaller eye (higher frequency) is, however, clealy attenuated as a result of the distortion caused by the cable. In FIG. 3b, the cable length is 7 km, whereby the smaller eye disappears and the signal is difficult to be identified as a bi-phase signal. So the detection of a distorted signal is very difficult in practice as appears from the description below.

A bi-phase signal is detected by an Integration and dump -method known per se, which method is illustrated in FIG. 2. The received bi-phase signal is integrated during the detection for a time period $\phi_1$ and the inverted bi-phase signal for a time period $\phi_2$ immediately following the time period $\phi_1$. In FIG. 2c, the integrator is reset to zero at a moment $t_1$ and an integration period is started. Because the bi-phase signal (FIG. 2b) is on the level "1" at the moment $t_1$, the integration takes place in the upward direction during the time period $\phi_1$. When the time period $\phi_2$ starts, the bi-phase signal is on the level "−1", but because the inverted bi-phase signal is integrated during the time period $\phi_2$ (i.e. the input of the integrator is on the "1"-level), the integration continues upwards. At the end of the time period $\phi_2$ a sample is taken of the integration level. At the beginning of the subsequent time period $\phi_1$, the integrator is again reset to zero and the integration is restarted. If the integration takes place in a correct phase, the integration results are positioned on both sides of the zero level close to the levels "1" and "−1", thus producing a two-level signal from which the data can be decoded.

Figure 2C:
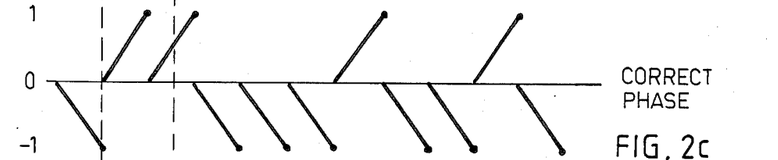
Figure 2D:
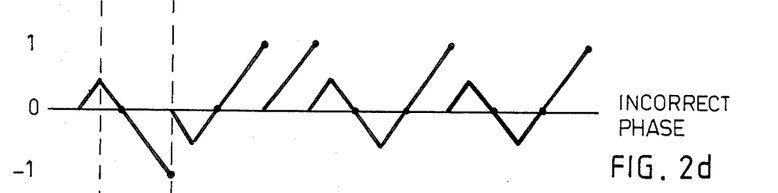

If the integration starts at an incorrect moment, it is carried out in accordance with FIG. 2d. This kind of integration occurring in an incorrect phase is discussed from the moment $t_2$ onwards. the bi-phase signal (FIG. 2b) is on the level "−1" at the moment $t_2$ so that the integration (FIG. 2d) takes place downwards during the time period $\phi_1$. When the time period $\phi_2$ starts, the bi-phase signal is still on the level "−1". However, the inverted bi-phase signal is applied to the integrator during the time period $\phi_2$, i.e. the level "1" in this particular case. As a result thereof the direction of the integration is reversed so that the integration is carried out upwards during the time period $\phi_2$. When a sample is taken of the integration level at the end of the time period $\phi_2$, the integration result obtained is near the zero level. It can be seen that when the integration takes place in an incorrect phase an "0" data is received, the integration results obtained are positioned close to the zero level. This information can be utilized to discover when the integration takes place in an incorrect phase. The situation of FIG. 2 is ideal, i.e. the bi-phase pulses are rectangular in shape. The cable, however, distorts the signal and causes rounding of the pulses. This in turn affects the integration results of the detector.

Figure 4A:
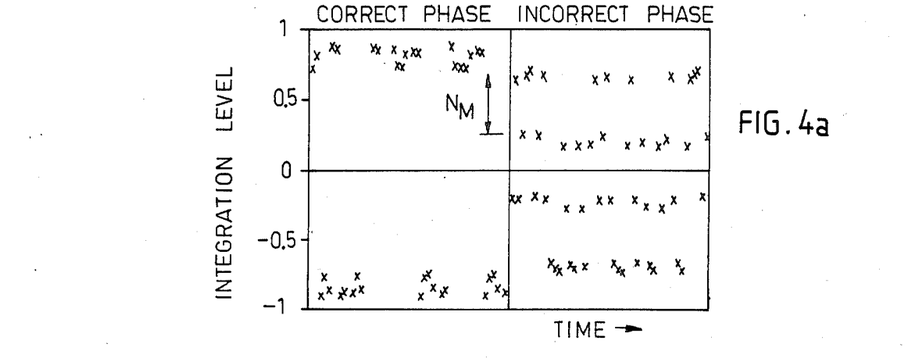
FIGS. 4a and 4b illustrate integration results of the signals of FIGS. 3a and 3b when the detection takes place in a correct and an incorrect phase.
Figure 4B:
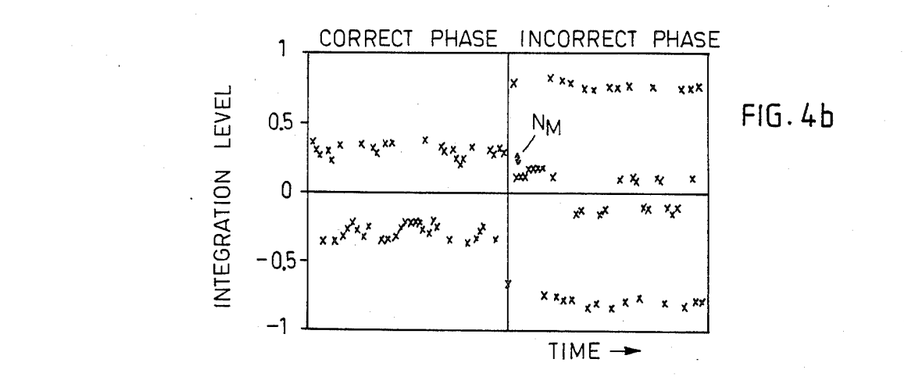

FIGS. 4a and 4b show the integration results of FIGS. 3a and 3b. In FIG. 4a, the integration results obtained in a correct phase are still near the ideal levels "1" and "−1". The noise margin ($N_M$), i.e. the difference between the integration results obtained in a correct phase and the "zero" integration results obtained in an incorrect phase, is still large so that it is still possible to discover a detection occurring in an incorrect phase. In FIG. 4b, the cable length has been increased to 7 km. Integration results obtained in a correct phase have shifted towards each other and nearer the zero level. It can also be seen that the "zero" integration results obtained in an incorrect phase are now near the integration results obtained in a correct phase. It is no longer possible to distinguish a correct and an incorrect phase from each other, and the reception is impossible.

Shifting of the integration levels obtained in a correct phase towards each other results from the attenuation distortion of the cable and is, in fact, proportional to the signal distortion caused by the cable. The signal is essentially undistorted when the obtained integration levels are on the levels "1" and "−1", and when the signal is distorted, the obtained integration levels begin to deviate from the levels "1" and "−1". The basic idea of the method according to the invention is to utilize this information to adjust an adaptive equalizer in such a manner that the effect of the equalizer essentially compensates for the distortion caused by the cable. This information can be applied in various ways. In the preferred embodiment of the invention disclosed below the adjusting criterion is based on the condition that the integration levels obtained in a correct phase are maintained constant on the prescribed level irrespective of the distortion of the signal. The effect exerted on the signal by the equalizer is thereby increased until the distortion is compensated for and the integration levels have shifted to the prescribed level.

Figure 5:
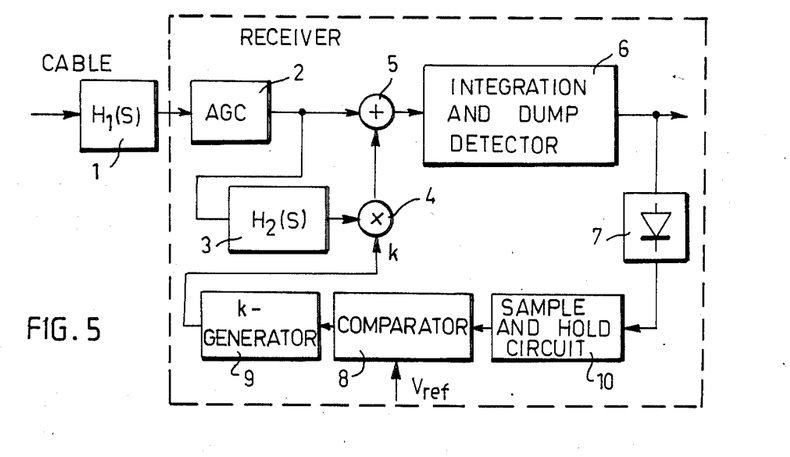
FIG. 5 is a block diagram of an equalizer according to the invention.

FIG. 5 shows a block diagram of a receiver in which the above condition has been applied. The bi-phase signal is transferred from the transmitter to the receiver over a cable having a transmission function $H_1(s)$ dependent on the parameters thereof. A four-wire system, for instance, can be used, whereby the two directions of transmission have their own pairs of wires. If the two directions of transmission used the same pair of wires, the effect of the outgoing signal on the signal received has to be eliminated, e.g., by the echo suppressing method. With regard to the receiver stages following the echo suppressing devices, the situation is the same as in a four-wire system. A detector of the Integration and dump -type requires that the level of the received signal be corrected before the signal is applied to the detector. The correction of the level requires an automatic gain control circuit 2 which can be included at the first stage of the receiver. The output signal of the automatic gain control circuit 2 is applied to an adder 5 and to an equalizer circuit 3 having a steady transfer function $H_2(s)$.

Figure 1B:
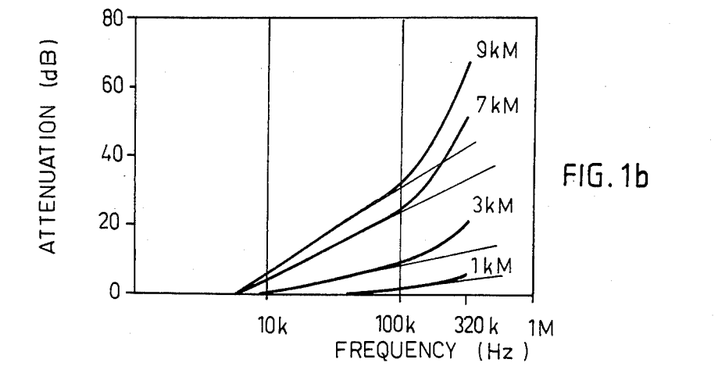
FIG. 1b shows the attenuation curves of FIG. 1a when the basic attenuation resulting from the cable length has been eliminated.
Figure 6:
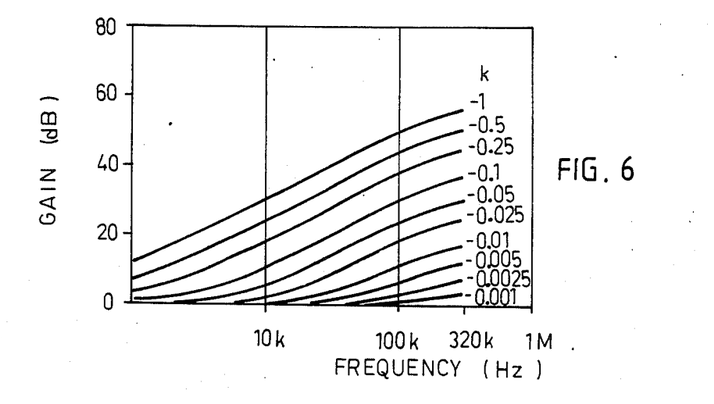
FIG. 6 shows the frequency response of the equalizer of FIG. 5 with different values of the correction coefficient k.
Figure 7A:
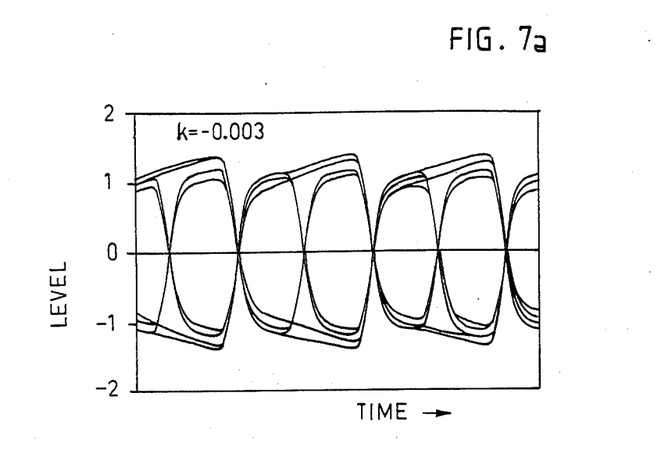
FIGS. 7a and 7b illustrate eye patterns of a bi-phase signal at a transmission speed of 80 kbit/s and with different cable lengths when the equalizer according to the invention is used.
Figure 7B:
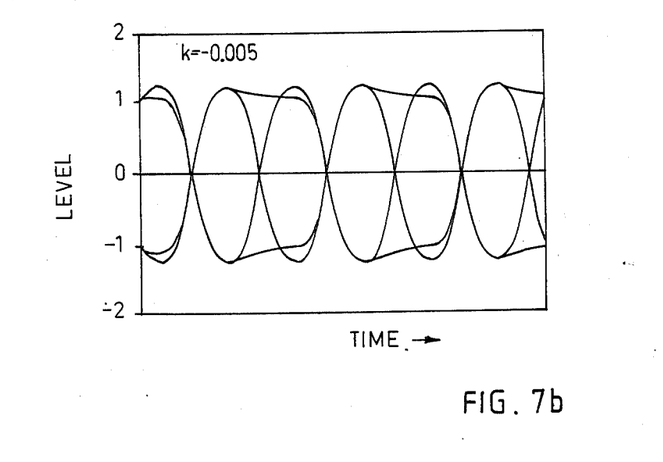

It is apparent from FIG. 1b that it is possible to roughly approximate tha attenuation behaviour of a cable by means of a single line. The basic attenuation of the cable has been eliminated from the attenuation curves of FIG. 1b, whereby there remains only that part of the attenuation which is essentially dependent on frequency. The frequency response of the equalizer circuit 3 of FIG. 5 can also be such as described in FIG. 6. The effect of any variation in the cable length or other parameters on the attenuation distortion is compensated for by means of the correction coefficient k. In the receiver of FIG. 5 this is effected by multiplying the output of the equalizer circuit 3 in a multiplier 4. The value of the coefficient k is determined in a control loop 10 described later on. The transfer function of the adjustable equalizer formed by the equalizer circuit 3, the multiplier 4 and the adder 5 is thus $1+k_2(s)$ which tends to approximate the inverse function $1/H_1(s)$ of the transfer function of the cable as well as possible, i.e. it amplifies the different frequencies of the cable to the same degree as the cable attenuates these. The output signal of the multiplier 4 is added to the received signal by means of the adder 5, the output signal of which is thus corrected to correspond to the signal before the cable connection. In FIGS. 7a and 7b, the signals of FIGS. 3a and 3b are seen in the corrected form in the output of the adder 5.

The sum signal is further applied to a detector 6 which detects this bi-phase signal by the Integration and dump -method described above. In the embodiment of FIG. 2, the detector 6 does not include any sample and hold circuit so that the output signal of the detector 6 equals the signal of FIG. 2c.

The output signal of the detector 6 is rectified by means of a rectifier 7, and a sample is taken of the rectified signal by a sample and hold circuit 10 at the end of each time period $\phi_2$. In this way the integration level of the detector is determined and this is compared with a predetermined reference level $V_{ref}$ in a comparator 8. A generating circuit 9 is controlled on the basis of the comparison, which circuit varies the value of k according to the described adjusting criterion so that the integration levels obtained from the detector 6 are equal to the predetermined reference level. The rectifier 7, the sample and hold circuit 10, the comparator 8 and the generating circuit 9 thus form the control loop mentioned above.

The operation of the described receiver will be further clarified. Let us assume that when the connection is started, the signal reaches the detector 6 with a distortion such as illustrated in FIG. 3b. The detector 6 detects the signal of FIG. 3b through integration in a correct phase according to the Integration and dump -method, whereby the integration results are, in principle, similar to those shown in FIG. 4b. The integration levels positioned above and below the zero level of a correct phase have approached each other and the zero level. It is to be noted that the integration results of FIG. 4b are obtained by taking samples directly from the output of the detector 6 by a further sample and hold circuit not shown in FIG. 5. The output signal of the sample and hold circuit is thereafter applied to a decoder which decodes the bi-phase signal back into the original data. However, the output signal of the detector 6 is rectified in the control loop of FIG. 5 before a sample is taken by means of the sampling circuit 10 of the control loop. The rectifier gives the sampling circuit 8 the absolute value of the sample. The rectifier 7 and the sampling circuit 10 can also be positioned in reversed order. The output level of the circuit 10 is considerably below the ideal level "1" for the signal of FIG. 3b so that when the reference level $V_{ref}$ is set to correspond to this level "1" of the detector, the comparator 8 gives an error signal. This error signal controls the generating circuit 9 so that it varies the value of k to increase the influence of the equalizer. This results in a slight improvement in the signal at the input of the detector, whereby also the output level of the sample and hold circuit slightly approaches the level "1". The generating circuit 9, however, further varies the correction coefficient k and, consequently, the influence of the equalizer, until the output level of the sample and hold circuit 10 equals to the reference level $V_{ref}$. Thereby the equalizer is so compensated for. Any shifts in the adjustment from this optimal value in either direction always results in signal distortion and dropping of the integration levels towards zero, whereby the control loop readjusts the equalizer.

It is characteristic of the equalizer of FIG. 5 that there occurs a minor delay between the reception of the first pulses of the signal and the setting of the adjustment of the equalizer. In practice, this delay, however, is significant.

Figure 8A:
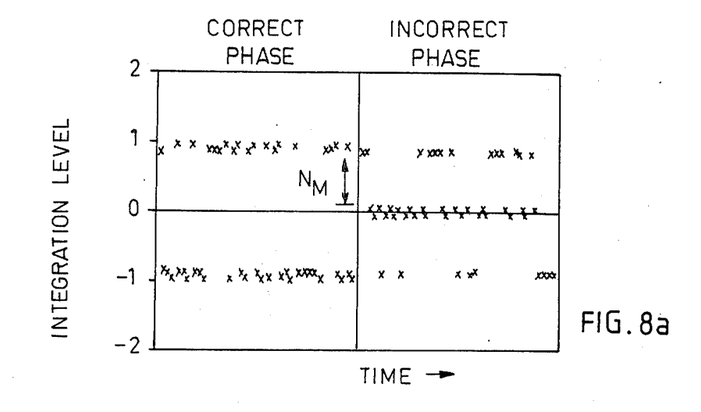
FIGS. 8a and 8b show the integration results of the signals of FIGS. 7a and 7b when the detection takes place in a correct and an incorrect phase.
Figure 8B:
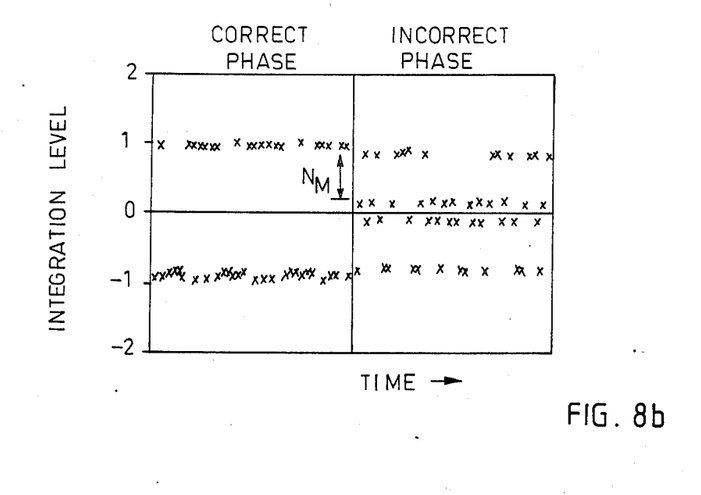

The efficiency of the adaptive equalizer according to the invention appears from FIGS. 7a and 7b, which show the eye patterns of FIGS. 3a and 3b when the method according to the invention is used. FIGS. 8a and 8b show the integration results corresponding to FIGS. 4a and 4b when the correction method according to the invention is used. The integration results of an integration carried out in a correct phase have shifted to the desired levels "1" and "−1". Correspondingly the "zero" integration results of an incorrect phase have shifted nearer the zeros level, i.e. the noise margin ($N_M$) for the distinction of a correct and an incorrect phase is larger.

DETAILED DESCRIPTION OF THE PREFERRED EMBODIMENT

Figure 9:
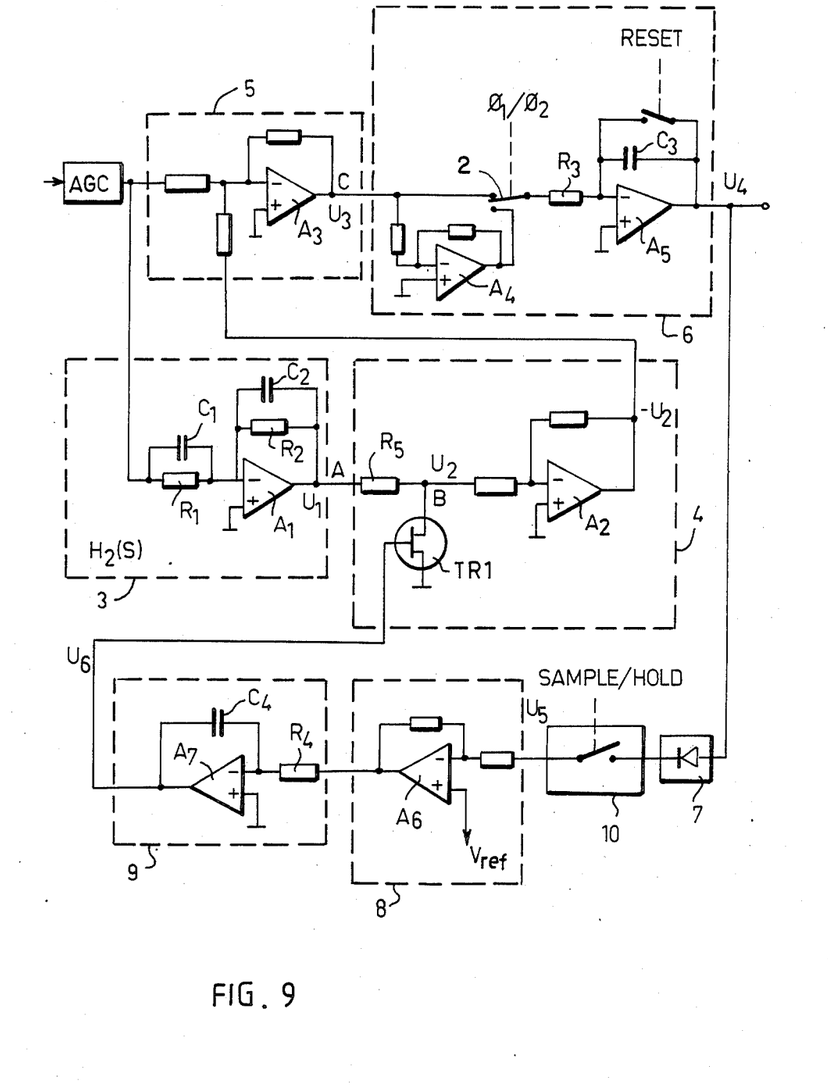
FIG. 9 illustrates one embodiment of the device according to the invention.

FIG. 9 shows one practical solution for carrying out the receiver according to FIG. 5. Only parts connect with the operation of the adaptive equalizer are shown in FIG. 9.

The received signal is treated at the first stage of the receiver, which stage comprises at least an automatic gain control (AGC). The output voltage $u_o$ of the AGC is applied to an equalizer circuit 3 which is formed by an operational amplifier $A_1$. The transfer function $H_2(s)$ of the equalizer circuit 3 may be determined by $$H_2(s) = -\frac{1+sT_1}{1+sT_2}$$

where $T_1=R_1C_1$ and $T_2=R_2C_2$-dimethylaminopropyl

The voltage at a point A is accordingly $u_1=H_2(s)\cdot u_o$. A resistor $R_5$ and a field effect transistor $TR_1$ from an attenuator in which the resistance of the field effect transistor $TR_1$ is varied by a control voltage $u_6$. This attenuator forms the multiplier 3 of FIG. 5. Depending on the control voltage, the voltage $u_2$ varies within the range $u_2=0-H_2(s)\cdot u_o$. The voltage $u_2$ is inverted by means of an inverter formed by an operational amplifier $A_2$ so that the voltages $u_2$ and $u_o$ would be the same phase. An operational amplifier $A_3$ forms an adder which sums the voltages $u_o$ and $-u_2=-H_2(s)\cdot u_o\cdot k$. Thus the voltage at point C becomes $$u_3 = -u_0(1 - H_2(s) \cdot k) \text{ or } u_3 = -u_0\left(1 + k\frac{1+sT_1}{1+sT_2}\right)$$

Figure 2E:
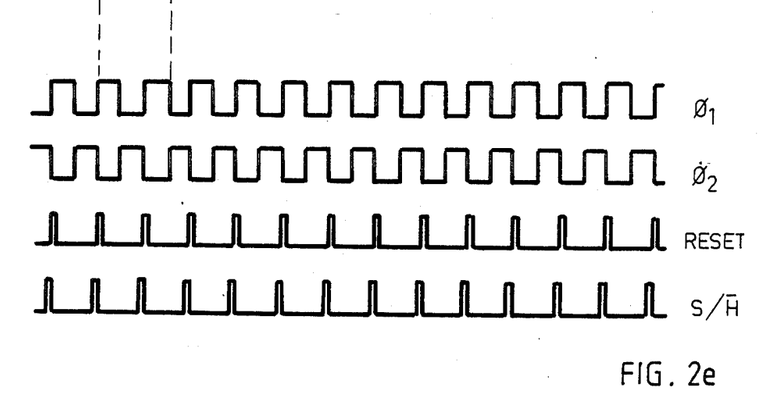

The detector 6 is formed by an integrator $A_5$ and an inverting amplifer $A_4$. The integrator is reset to zero at the beginning of the time period $\phi_1$ by discharging the charge of a capacitor $C_3$ by a switching element 1 which is controlled by a RESET signal obtained from elsewhere in the receiver. The input of the integrator $A_5$ by a switching element 2 for the time period $\phi_1$ and to the output of the inverter $A_4$ for the time period $\phi_2$. The switching element 2 is controlled by a control signal $\phi_1/\phi_2$ obtained from elsewhere in the receiver. The timings of the control signals can be seen in FIG. 2e. At the beginning of the time period $\phi_1$ the integrator is reset to zero by the switching element 1, and the input of the integrator is connected to the output of the adder $A_3$ by said switching element 2. During the time period $\phi_1$, the voltage $u_3$ is integrated. When the period $\phi_1$ ends and the period $\phi_2$ starts, the input of the integrator $A_5$ is connected to the output of the inverting amplifier $A_4$, whereby the voltage $-u_3$ is integrated during the time period $\phi_2$. The output voltage $u_4$ of the integrator $A_5$ is such as illustrated in FIG. 2c. The voltage $u_4$ is rectified by the rectifier 7, from the output of which the sample and hold circuit 10 takes a sample immediately before the resetting of the integrator $A_5$. The voltage $u_5$ used in the control loop is obtained in this way. An operational amplifier $A_6$ serves as a comparator which compares the voltage $u_5$ with a prescribed reference voltage $V_{ref}$. The offset voltage obtained as the output of the comparator 8 is integrated by an integrator $A_7$ in order to produce a control voltage $u_6$. In this embodiment, the integrator $A_7$ forms the generating circuit 9 of FIG. 5. The control voltage $u_6$ used in the setting of the coefficient k is obtained as an output of the integrator.

If the output voltage of the sample and hold circuit 10 differs from the reference voltage $V_{ref}$, the output voltage $u_6$ of the integrator $A_5$ tends to increase the effect of the equalizer on the received signal, i.e. to increase the value of the correction coefficient k. This takes place in such a manner that the control voltage $u_6$ increases the resistance of the field effect transistor $TR_1$ so that the attenuation of the attenuator (the resistor $R_5$ and the transistor $TR_1$) is reduced, the voltage $u_2$ thereby being increased. This in turn increases the output levels of the detector and the voltage $u_5$. This goes on until $u_5 = V_{ref}$. The offset voltage has thereby the value 0 and the control voltage $u_6$ ranges between the values from $-V_{ref}$ to 0. Deviation from the optimal adjustment thus obtains results in which the signal is distorted and the voltage $u_5$ reduced. As a result thereof, the offset voltage is increased, and the output voltage $u_6$ of the integrator $A_7$ is shifted so that the adjustment again shifts towards the optimum. As the time constant of the integrator $A_7$ is much larger than the sampling interval, the correct adjustment is very accurately maintained by the control loop.

The method according to the invention has been described above in connection with a bi-phase coded signal. The method, however, is not restricted to a bi-phase code only but it can be applied to other codes, too, such as, e.g., a three-level AMI. Change of the code brings about changes in the detection block only (FIG. 5, block 6).

A fully analog embodiment has been described above but the device can be effected in a fully digital form, too. The A/D-conversion can thereby be carried out before the automatic gain control or preferably after it. Further, the device can be analog with the exception of the generation of the correction coefficient which takes place digitally, the values of the correction coefficient being thereby discrete. In a further embodiment of the invention, the blocks 3 and 5 of FIG. 5 are analog and the block 4 analog with discrete values, while the other parts can be digital.

Even if specific embodiments of the present invention have been described above, it is to be understood that various modifications and alterations are possible within the scope of protection defined in the attached claims.

What is claimed is:

1. A method for the correction of signal distortion caused by a cable in the receiver of a digital data transmission system comprising the steps of:
   treating the received signal by an equalizer circuit,
   multiplying the output signal of the equalizer circuit by a correction coefficient,
   combining the signal obtained through said multiplication with received signal to produce a corrected signal,
   detecting the corrected signal,
   taking a sample value of the detected signal at a prescribed moment and holding said sample value up to the subsequent sampling,
   comparing said sample value with a prescribed reference value, and
   determining the value of a new correction coefficient on the basis of said comparison in order obtain a sample value equalling to the reference value.

2. Method according to claim 1, wherein in the step for the detection of the corrected signal, the corrected signal is applied to the integrator to be integrated in the input thereof during a first prescribed period of time and to be integrated in the input thereof in inverted form during a second prescribed period of time, and wherein the integrator is reset to zero at the end of said second period of time, and the step for taking a sample value of the detected signal takes place at a prescribed moment at the end of the second period of time prior to the resetting of the integrator.

3. Method according to claim 1 wherein in the step for determining the value of the new correction coefficient the result of said comparison is integrated analogously.

4. Method according to claim 1, wherein in the step for determining the value of the new correction coefficient the result of said comparison is integrated digitally.

5. A receiver in a digital data transmission system, said receiver comprising means for correcting a signal distortion caused by a cable, comprising:
   an equalizer circuit for the treatment of a received signal,
   multiplying means for multiplying the output signal of the equalizer circuit applied to the first input of said multiplying means by a correction coefficient,
   a signal applied to the second input thereof determining the value of said correction coefficient,
   combining means for producing a corrected output signal from said received signal applied to the first input of said combining means and the output signal of the multiplying means applied to the second input thereof, whereby the transfer function of an equalizer formed by the equalizer circuit, the multiplying means and the combining means approximates the inverse function of the transfer function of the cable, detecting means for detecting the corrected signal, a sample and hold circuit for taking a sample value of the output of the detecting means at a prescribed moment and for holding the obtained sample value up to the subsequent sampling, comparing means for comparing the sample vlaue with a prescribed reference value, generating means for generating the correction coefficient, said generating means producing a signal determining the value of a new correction coefficient on the basis of the output signal of the comparing means, which value represents a sample value equal to the reference value, the output of said generating means being connected to said second input of the multiplying means.

6. Receiver according to claim 5, wherein said detecting means comprises an integrator which integrates said corrected signal in the input thereof during a first prescribed period of time, which integrates said corrected signal in inverted form in the input thereof during a second prescribed period of time, said detecting means further comprising means for inverting the corrected signal applied to the input of the integrator during the second period of time and means for resetting said integrator at the end of the second period of time, the output of the integrator being connected to the input of the sample and hold circuit for taking a sample value of the output of the integrator at a prescribed moment at the end of the second period of time prior to the resetting of the integrator.

7. Receiver according to claim 5, wherein said means for generating the correction coefficient comprises an integrator, the input of which is connected to the output of the comparing means.

8. Receiver according to claim 5, wherein said receiver is comprised of analog circuitry.

9. Receiver according to claim 5, wherein said receiver is analog except that said means for generating the correction coefficient is digital, the values of the correction coefficient being discrete.

10. Receiver according to claim 5, wherein the receiver is comprised of digital circuitry.

11. Receiver according to claim 5 or 6, wherein said receiver is digital except that the equalizer circuit and the combining means are analog, the multiplying means also being analog with discrete values.

12. Receiver according to claim 5, wherein said sample and hold circuit comprises a rectifier which yields the absolute value of the output signal of the detecting means for sampling.

13. Receiver according to claim 5, wherein said sample and hold circuit comprises a rectifier which yields the absolute value of the obtained sample value after sampling.

14. Receiver according to claim 7, wherein the integrator of the generating means is analog.

15. Receiver according to claim 7, wherein the integrator of the generating means is digital.

* * * * *